United States Patent [19]

McCandless et al.

[11] Patent Number: 5,478,630
[45] Date of Patent: Dec. 26, 1995

[54] RUBBER SURFACE TREATMENT AND PRODUCTS DERIVED THEREFROM

[75] Inventors: James R. McCandless, Akron; Bharat K. Kansupada, Mogadore, both of Ohio

[73] Assignee: The Goodyear Tire & Rubber Company, Akron, Ohio

[21] Appl. No.: 96,396

[22] Filed: Jul. 26, 1993

[51] Int. Cl.$^6$ .................................................. B05D 5/10
[52] U.S. Cl. .................................. 427/208.4; 427/208.2; 427/207.1; 428/515; 428/516; 428/517; 428/521; 428/523
[58] Field of Search ............................. 428/515, 516, 428/517, 521, 523; 427/207.1, 208.2, 208.4

[56] References Cited

U.S. PATENT DOCUMENTS 3,776,811  12/1973  Eckert et al. ........................ 161/253
4,156,671  5/1979  Keown et al. ...................... 260/32.8 R

*Primary Examiner*—Edward Cain
*Attorney, Agent, or Firm*—Henry C. Young, Jr.

[57] ABSTRACT

The treatment of an uncured or partially cured rubber surface with a solvent mixture of a blend of n-heptane and iso-heptane. The treatment is to remove surface bloom and/or freshen the surface and to maintain or increase building tack. Cured adhesion can also be enhanced or maintained. An appropriate solvent mixture is provided. An article can be produced thereby as a cured assembly of rubber components. In one aspect, a purpose is to provide a suitable solvent mixture treatment of an uncured or partially cured rubber surface with a solvent mixture which has an acceptably minimal aromatic content, suitable drying time on the rubber surface and an acceptable odor in the workplace.

14 Claims, No Drawings

RUBBER SURFACE TREATMENT AND PRODUCTS DERIVED THEREFROM

FIELD

This invention relates to solvent treating a rubber surface, and particularly an uncured rubber surface. The invention further relates to a method of fabricating rubber products with at least one component of a solvent-treated rubber surface, particularly an uncured rubber surface, and to products composed of such an assembly of rubber components.

A purpose of the treatment is to remove surface bloom and/or to freshen the rubber surface and to maintain or increase building tack for uncured or partially cured rubber surfaces. Cured adhesion (adhesion of a treated uncured rubber surface to another uncured rubber surface upon pressing the surfaces together and curing the assembly) is considered herein as being enhanced or maintained. An appropriate solvent mixture is provided. An article can be produced thereby as a cured assembly of rubber components. In one aspect, a purpose is to provide a suitable solvent mixture treatment of an uncured or partially cured rubber surface with a solvent mixture which has an acceptably minimal aromatic content, suitable drying time on the rubber surface and an acceptable odor in the workplace.

In the description of this invention, while uncured rubber surfaces are primarily considered, it is contemplated herein that partially cured rubber surfaces may also be treated according to this invention. Therefore, in the description of this invention, it is intended that the term "uncured" include "partially cured", but not fully cured, rubber surfaces

BACKGROUND

Rubber products are often prepared by assembling a multiplicity of uncured rubber components, although sometimes a combination of uncured and cured rubber components, which desirably requires them to have a somewhat tacky surface to enhance the stability of their assembly, followed by curing the resulting assembly under conditions of elevated temperature and pressure. Such tack is often referred to as building tack. The use of building tack in fabricating rubber products is well known to those skilled in such art. Usually building tack is used in the context of uncured rubber and, in this description, it is also used in the context of partially cured rubber. In this description, cured rubber is normally equated with partially cured rubber for the treatment purposes.

For such purpose, a conventional practice is to treat at least one of the uncured rubber surfaces with a solvent in order to both make the rubber surface tacky and, of a usually equal importance, to remove surface bloom from the rubber surface and/or freshen the rubber surface. Sometimes, the surface is treated with a rubber cement based on such solvent. The surface bloom is often in the form of various oils, fatty acid salts, antidegradants and waxes which have migrated to the surface of the rubber over a period of time and which often tend to inhibit a strong cure between the assembled rubber component surfaces.

In the practice of this invention, removal, or substantial removal, of the surface bloom is a primary consideration.

Of sometimes equal importance, freshening the rubber surface is a primary consideration. In some circumstances, where the uncured rubber surface has been exposed to the atmosphere, such as, for example, storage while the uncured rubber awaits final processing or building into a rubber product, the surface can become contaminated with foreign materials, such as dust or chemicals or by aging or oxidation. Freshening the rubber surface, as referenced herein, is intended to mean the substantial or complete removal of foreign materials and/or oxidation from the rubber surface by solvent treatment and thereby "freshening" the surface. While such freshening does not necessarily increase tack, it is intended that it enhance cured adhesion (to reduce interfacial adhesion failure) as compared to a contaminated uncured rubber surface which has not been freshened.

While various aromatic solvents have heretofore demonstrated an ability to provide adequate building tack for uncured rubber surfaces, it is desired to provide an essentially aliphatic solvent for such surface treatment which has an adequate drying time, essentially eliminates or removes uncured rubber surface bloom, provides uncured rubber surface building tack, provides or enables an interfacial rubber surface adhesion after curing the rubber assembly and contains less than about one weight percent aromatic components.

Accordingly, it is desired to provide a solvent for such purposes which contains less than one weight percent and, thus, is basically free, of aromatic materials such as, for example, benzene, alkyl substituted benzenes, xylene and alkyl substituted xylenes as designated aromatic and substituted aromatic hydrocarbons. It is also desired that it contains less than about one weight percent n-hexane or cyclohexane.

It is desirably required of such solvent that it effectively tackifies rubber surfaces, particularly uncured rubber surfaces, to provide adequate building tack so as to hold the rubber components together prior to curing the assembly and, further, to have a satisfactory short drying time in a practical application.

The solvent ability of a solvent is considered to be important for removing surface bloom from the rubber surface. It is believed that a suitable test for such solvent ability is a Kauri-Butanol (KG) test.

By experience, it is considered herein that a hydrocarbon solvent or solvent mixture having a KG value in a range of about 25 to about 38, preferably about 25 to about 34, is generally satisfactory for the solvency purposes of this invention.

The KG (Kauri-Butanol) values can be conventionally determined by first dissolving 100 grams of Kauri Gum in 500 grams of butanol (thus, the designation KG). The desired solvent, or solvent mixture, is titrated into the KG solution to determine its KG value. KG values have been published in the literature for various aromatic and aliphatic hydrocarbon solvents. The KG value is, generally, an indication of the solubility of the Kauri Gum resin (contained in the butanol solution) in the solvent being tested.

For example, a KG value for toluene or benzene would be about 105–110; cyclohexane about 100; and n-heptane would be about 29.

A reference to the KG test may be found in "Physical And Chemical Examination of Paints, Varnishes, Lacquers And Colors", Eleventh Edition, 1950, pages 449–451, by Gardner and Sward, originally distributed by The Henry Gardner Laboratory, Inc., Bethesda, Md.

Various solvent systems were evaluated for use in treating uncured rubber to aid in the fabrication of rubber products.

The n-heptane, an aliphatic $C_7$ hydrocarbon with a KG value of about 29, was previously evaluated. However, the n-heptane was considered to be inappropriate because its observed drying time was found to be unacceptable because it was too slow and it was observed to not provide adequate building tack for the treated uncured rubber surface.

The n-heptane was, however, considered to be a good solvent if it could possibly be successfully used as a blend with other hydrocarbons because of its nearly adequate drying time and its KG value.

It was decided to proceed to evaluate hydrocarbon solvent blends which had a n-heptane base for the rubber tackifying purposes, which would have the properties of an adequate drying time, bloom removal and the providing of an observed satisfactory building tack for a rubber surface, particularly an uncured rubber surface.

It was previously found by the inventors that a solvent blend having a KG value in a range of about 32 to about 38 and comprised of (A) about 15 to about 25 parts by weight n-heptane; and (B) about 55 to about 65 parts by weight of at least one of methylcyclohexane and cis 1,2-methylcyclopentane could be used to treat uncured rubber surfaces to remove surface bloom and enhance or maintain tack. However, such a solvent blend was subsequently observed to have a somewhat objectional odor in the workplace. Thus, it remains desirable to discover additional solvent blends which can satisfactorily achieve the surface bloom and enhance or maintain the uncured rubber surface tack.

In the description of this invention, for the treatment purposes, uncured rubber means uncured compounded rubber. Compounded rubber is used in a conventional sense, namely, for rubber which has been mixed with compounding ingredients.

DISCLOSURE AND PRACTICE OF THE INVENTION

In accordance with this invention, it has been discovered that a method of treating a rubber surface, preferably an uncured or partially cured rubber surface, and particularly as a method of removing any surface bloom and/or freshening the rubber surface while adding or maintaining tack, particularly building tack, to such surface, comprises treating at least one surface of a rubber article with a hydrocarbon solvent mixture and drying said treated surface; wherein said solvent mixture has an aromatic hydrocarbon content, if any, of less than about one (1), preferably less than about 0.5, weight percent, including a benzene content, if any, of less than 0.01 weight percent, and is comprised of a blend of, based on 100 parts by weight, (A) about 10 to about 25 parts by weight of n-heptane; and (B) about 65 to about 85 parts by weight of iso-heptane wherein said solvent mixture is characterized by having a KG value in a range of about 27 to about 31, preferably about 28 to about 30 and an initial boiling point of a minimum of at least about 85° C and a maximum dry point of less than about 106° C.

Said solvent can contain up to about 18, preferably up to about 10, percent by weight, based on the total solvent, of at least one other liquid $C_6$ to $C_8$ saturated alkyl branched aliphatic hydrocarbon and/or liquid $C_5$ to $C_7$ liquid saturated alicyclic hydrocarbon exclusive of cyclohexane and so long as the KG value requirement is met for the overall solvent blend and the solvent mixture, including the n-heptane and iso-heptane, has a minimum initial boiling point of at least 85° C. and a maximum dry point of less than about 106° C. This refers to such hydrocarbons which contain 6 to 8, and/or 5 to 7, carbon atoms, respectively. Such other saturated hydrocarbons can include, for example, non-aromatic $C_7$ cyclic hydrocarbons having a five carbon atom ring; non-aromatic $C_7$ cyclic hydrocarbons having a six carbon atom ring.

In the practice of this invention, the solvent mixture is considered as being characterized as containing less than one (1), preferably less than about 0.5, weight percent, of any one of cyclohexane, n-hexane, toluene and xylene if it contains any of such materials. Thus, a reference to the solvent mixture as being exclusive of cyclohexane means that it contains less than one (1), preferably less than about 0.5, weight percent thereof, if it contains any cyclohexane. Preferably, the solvent mixture contains no benzene whatsoever.

For the boiling point characterization of the solvent mixture, represented by the initial boiling point and the dry point, a distillation range at 760 mm Hg is referred to herein as may be determined by ASTM D86. It is considered herein that the boiling point characterization is important as an indicator of the solvent drying time.

It is required, in one aspect, that the solvent blend contains less than one (1), preferably less than 0.5, and more preferably less than 0.2, weight percent aromatic hydrocarbons, particularly of any of ethylbenzene, metaxylene, paraxylene, orthoxylene and cumene, aliphatic hydrocarbons having less than 6 and more than 8 carbon atoms and alicyclic hydrocarbons having less than 5 and more than 7 carbon atoms including n-hexane and cyclohexane. This restriction and characterization is intended to indicate and mean that one or more or all of such materials may not be present in the solvent or may be present up to the stated amount.

Thus, in one aspect of the invention, an aliphatic solvent, particularly for treating uncured or partially cured rubber, is the said hydrocarbon mixture having a KG value in the range of about 27 to about 31, preferably about 28 to about 30 and comprises a blend of, based on 100 parts by weight, (A) about 10 to about 35 parts by weight n-heptane, and (B) about 65 to about 85 parts by weight of isoheptane.

As hereinbefore pointed out, such solvent can contain up to about 18, preferably up to 10 percent by weight, based on the total solvent, of said other saturated alkyl branched aliphatic and/or alicyclic hydrocarbons.

As previously pointed out, the drying time of the solvent on the rubber surface (e.g. at 24° C.) is important in that it should be long enough for the solvent to have the desired and described effects and, also, to be short enough, on a practical basis, so that it suitably evaporates from the rubber surface treated rubber component(s) can be assembled in a relatively short time. In the practice of this invention, boiling point parameters (at normal atmospheric pressure) for such purpose are considered to be (i) an initial boiling point of a minimum of about 85° C. and, (ii) a final dry point (flash distilling the solvent to a dry point) of a maximum of about 105° C.

It has been observed that a rubber surface with good building tack can be obtained together with adequate removal of surface bloom which results in assembled uncured rubber products demonstrating good uncured adhesion of the individual tackified components. The building tack relates to the force needed to pull apart, or separate, an uncured rubber component from another uncured rubber component or a partially cured rubber component before curing the assembly thereof. Building tack for assembling rubber components is well known to those having skill in such art.

Cured adhesion between the rubber components of the cured assembly thereof has also been found, in some cases, to be enhanced, apparently due to removal of the surface bloom and conditioning of the rubber surface by the solvent of this invention.

In another aspect of this invention, a method of producing a rubber product composed of a multiplicity of rubber components comprises treating a surface of an uncured or partially cured rubber component with the solvent required by this invention to remove surface bloom therefrom. As hereinbefore pointed out, such surface bloom typically consists of one or more of surface oils, fatty acid salts, antidegradants and waxes. As previously pointed out, such treatment has been observed to cause said surface to have building tack. Then, the treated rubber component is adhered to at least one additional rubber component and the resulting assembly is cured by submitting the assembly to conditions of elevated temperature and pressure.

As will be shown in the following results of the example contained herein, after considerable experimentation and evaluation, it is considered that the object of providing a novel solvent (mixture), and particularly the use thereof, for treating uncured rubber surfaces with attendant requirements therefor have been accomplished.

In an additional aspect of this invention, the hydrocarbon solvent is in a form of a cement comprised of a mixture of said solvent and a solution and/or suspension of compounded rubber therein. In such case, the compounded rubber for the cement comprises from about 5 up to about 25 weight percent of the total of such cement mixture. Such cements are typically used as coatings on the uncured rubber surface to enhance building tack and cured adhesion between surfaces of rubber components in the cured assembly thereof. It is considered that the solvent component of the cement proceeds to clean the uncured rubber of any bloom and adds building tack.

In such applications, the rubber surface is treated with the rubber cement and dried to remove the solvent before assembling the rubber components.

Rubber cements using the solvent of this invention have been observed to especially enhance such cured adhesion. The compounded rubber component of the cement is considered to contribute to such cured adhesion between the assembly of rubber components.

The uncured, or partially cured, rubber surface which is considered for treatment by the solvent blend of this invention, including said rubber cement, can be rubbers or blends of rubbers which are typically those which are sulfur curable in nature but, however, it is considered that peroxide cured rubbers or curable rubbers are also to be considered. Sometimes a combination of sulfur and resin cure systems are used for relatively low unsaturation rubbers such as butyl rubbers and EPDM rubbers. Such systems are well known to those having skill in such art.

Typically, butyl rubbers which include halobutyl rubbers and EPDM rubbers have little building tack unless especially compounded (mixed) with oils and tackifying oils. The solvent of this invention is particularly useful for removing surface bloom from the surface thereof and enhancing its building tack.

The rubber surface to be treated can also be an uncured high unsaturation diene derived rubber which may already have some degree of building tack.

As is as well known to those having skill in the rubber art, sulfur curable rubber blends are blends of rubbers which contain carbon-to-carbon double bonds which sulfur acts upon to create the cured rubber products. Usually such high unsaturation diene derived rubbers (carbon to carbon bond unsaturation) are selected from diene unit containing rubbers which may include, although not limited thereto, cis 1,4-polybutadiene, trans 1,4-polybutadiene, cis 1,4-polyisoprene, trans 1,4-polyisoprene, medium vinyl polybutadiene, styrene/butadiene copolymer rubbers, as well as chloroprene rubber. Low unsaturation rubbers may be selected, for example, from butyl and halobutyl rubbers and from EPDM rubbers.

The butyl rubbers are typically in the form of a copolymer of isobutylene with a minor amount of isoprene, and it is further considered that such butyl rubbers may be halobutyl rubbers such as, in particular, chlorobutyl and bromobutyl rubbers.

The solvent of this invention, including its form as a rubber cement, is particularly useful for treating butyl rubber, including halobutyl rubber, compounds for adhering to high unsaturation rubber compounds followed by curing the resultant assembly.

The method of this invention can be used to aid in the assembly of rubber components for various articles including tires and industrial products, including belts and hoses.

It is to be appreciated that the uncured or partially cured rubber is typically a blend of the aforesaid rubber in combination with various compounding ingredients therefor which includes, for example; carbon black, zinc oxide, zinc stearate or stearic acid, antidegradants such as antioxidants and antiozonants, waxes-particularly microcrystalline waxes, silica and possibly couplers for the silica, resins, sulfur and cure accelerator(s).

In the description of this invention, the terms "uncured" and "partially cured" rubber are used. The terms are intended to relate to compounded rubber which is rubber mixed with appropriate compounding ingredients, including curatives. The term "partially cured" usually means rubber which is less than about 80% cured. In the practice of this invention, it is intended that the solvent and/or solvent-based rubber cement be used to treat uncured and/or partially cured compounded rubber compositions.

The practice of this invention is more illustrated shown in the following Examples in which the parts and the percentages are by weight unless otherwise indicated, although the invention is not to be limited to the Examples.

EXAMPLE I

Uncured rubber samples are prepared having a dimension of about 2.54 cm by about 15.2 cm and a thickness of about 0.16 cm.

The uncured rubber samples and identified as Exp. A and Exp. B and were comprised of the following ingredients shown in Table 1.

TABLE 1

| Material | Parts | |
|---|---|---|
| | Exp A | Exp B |
| Bromobutyl Rubber | 90 | 0 |
| Natural Rubber or Polyisoprene SBR Rubber | 10 | 70 |
| | 0 | 30 |
| Carbon Black | 55 | 50 |
| Resin, Phenolic[1] | 5[2] | 4[3] |
| Process Oil | 6 | 17 |

[1]Phenol formaldehyde resin.
[2]Reactive.
[3]Non-reactive.

Conventional amounts of zinc oxide, zinc stearate and other zinc salts of fatty acids, accelerator(s) and sulfur were used, except for low sulfur for Exp. A.

Solvent blends were evaluated by treating the surface of an uncured sample of the composition of Exp. A with the solvent representative of which is illustrated in the following Table 2 which is characterized by having a KG in a range of about 27–31 and by having an initial boiling point of about 87° C. and a maximum dry point of about 105° C.

TABLE 2

| Hydrocarbon | Parts Solvent A[1] |
|---|---|
| N-Heptane | 17 |
| Iso-Heptane | 73 |
| Other Hydrocarbons | 10[1] |

[1]Reportedly comprised of the following major constituents: $C_7$ cyclic 5 carbon ring naphthene, $C_7$ cyclic 6 carbon ring naphthene and $C_8$ isoparaffin.

The rubber sample Exp. A identified in Table 1 herein was treated by applying by swabbing solvent illustrated by Table 2 to its surface at a temperature of about 24° C. followed by allowing the surface to dry for about 1–2 minutes at about 24° C. The drying time for the solvent on the rubber surface was considered to be adequate.

The surface of the treated rubber was observed to have building tack and further visually appeared as clean and refreshed. Thus, any bloom and/or contaminants on the surface of the sample had been removed.

An untreated and uncured rubber sample (Exp. B) was then pressed against the surface of the treated rubber sample Exp. A.

The assembly was evaluated for adhesion of sample Exp. B to treated sample Exp. A by measuring the force to pull them apart at a 90° angle on an Instron Tester at a crosshead speed of 5 inches (12.7 cm) per minute.

Such an assembly of Exp. A and Exp. B was also cured under conditions of elevated temperature (150° C.) and pressure.

The cured adhesion of Exp. B to Exp. A was measured by the same type of test except that the samples were pulled apart at a 180° angle at a crosshead speed of 20 inches (50.8 cm) per minute.

The test results are summarized in the following Table 3.

TABLE 3

| Assembly | Adhesion |
|---|---|
| Uncured | 10 Newtons |
| Cured | 25 Newtons |

Thus, these experiments demonstrate that good and acceptable building tack (uncured assembly) and cured adhesion (cured assembly) was obtained. This is considered successful for building rubber products.

EXAMPLE II

Rubber samples were prepared as in Example I. The rubbers were compounded according to Table 4. The samples are identified herein as Exp. C and Exp. D.

TABLE 4

| | Parts | |
|---|---|---|
| Material | Exp C | Exp D |
| Natural Rubber | 100 | 50 |
| Polybutadiene Rubber | 0 | 50 |
| Carbon Black | 38 | 45 |
| Silica | 17 | 0 |
| Zinc Oxide | 10 | 5 |
| Oil | 0 | 6 |
| Tackifying Phenolic Resin | 3 | 0 |
| Wax | 0 | 2 |

Conventional amounts of antidegradants, stearic acid, accelerator(s) and sulfur were used in Exp. C and Exp. D.

Sample Exp. C was submitted to partial cure conditions of elevated temperature and pressure.

While the phenolic resin is added to the rubber compound (Exp. C) to enhance its building tack, such tack is normally relatively rapidly lost due to the aforesaid formation of rubber surface bloom, although in this example, Exp. C is utilized before an extensive surface bloom is formed. In the specific case of Exp. C, building tack is also lost due to its partial pre-cure treatment.

After cooling the partially cured sample Exp. C to about 24° C., its surface was treated with the solvent of Table 2 and dried for a few minutes at about 24° C.

The treated surface of Exp. C was observed to have building tack and looked clean and the drying time was considered to be adequate.

Samples Exp. C and Exp. D were pressed together.

Adhesion tests were made of the uncured assembly in a manner described in Example I and found to be 10 Newtons which is considered to be a good and acceptable building tack.

While certain representative embodiments and details have been shown for the purpose of illustrating the invention, it will be apparent to those skilled in this art that various changes and modifications may be made therein without departing from the spirit or scope of the invention.

What is claimed is:

1. A method of treating a rubber surface which comprises treating at least one surface of an uncured or partially cured rubber article with a hydrocarbon solvent mixture and drying said treated surface wherein said solvent mixture has an aromatic hydrocarbon content, if any, of less than one (1) weight percent, including a benzene content, if any, of less than 0.01 weight percent, and is comprised of, based on 100 parts by weight, (A) about 10 to about 35 parts by weight of n-heptane, and (B) about 65 to about 85 parts by weight of iso-heptane, wherein said solvent mixture is characterized by having a KB value in a range of about 27 to about to about 31 and the solvent mixture has an initial boiling point of a minimum of at least about 85° C. and a maximum dry point of less than about 106° C.

2. The method of claim 1 characterized in that said hydrocarbon solvent mixture also contains up to about 18 percent by weight, based on the total solvent, of at least one additional liquid saturated alkyl branched aliphatic hydrocarbon having from 6 to 8 carbon atoms and/or liquid saturated alicyclic hydrocarbon having from 5 to 7 carbon atoms, exclusive of cyclohexane, and so long as the KB value of the overall solvent mixture is in the said range of about 27 to about to about 31 and the solvent mixture has an initial boiling point of a minimum of at least about 85° C. and a maximum dry point of less than about 106° C.

3. The method of claim 1 characterized in that said hydrocarbon solvent mixture is in a form of a cement composed of a mixture of said solvent and a solution and/or suspension of compounded rubber therein.

4. The method of claim 2 characterized in that said hydrocarbon solvent mixture is in a form of a cement composed of the said solvent and a solution and/or suspension of compounded rubber therein.

5. A method of adding building tack to a rubber surface characterized by treating at least one surface of an uncured or partially cured rubber article with the hydrocarbon solvent mixture according to claim 1 and drying said treated surface.

6. A method of adding building tack to a rubber surface characterized by treating at least one surface of an uncured or partially cured rubber article with the hydrocarbon mixture according to claim 2 and drying said treated surface.

7. The method of claim 6 characterized in that said uncured rubber is comprised of at least one of EPDM, butyl rubber and halobutyl rubber.

8. The method of claim 6 characterized in that said uncured or partially cured rubber is comprised of a high unsaturation diene derived rubber.

9. A method of freshening a rubber surface characterized by treating at least one surface of an uncured or partially cured rubber article with the hydrocarbon solvent mixture according to claim 1 and drying the treated surface.

10. A method of freshening a rubber surface characterized by treating at least one surface of an uncured or partially cured rubber article with the hydrocarbon solvent mixture according to claim 2 and drying the treated surface.

11. A method of producing a rubber product which comprises the steps of (A) treating a surface of a first curable rubber article with a hydrocarbon solvent to add building tack to said treated surface and remove surface bloom therefrom, (B) adhering a second rubber article, selected from curable and cured rubber articles, to the said treated surface of the first rubber article to create an assembly thereof, and (C) submitting said assembly to rubber curing conditions of elevated temperature and pressure; characterized in that said surface of said first curable rubber article is treated according to the method of claim 1.

12. The method of claim 11 characterized in that the said rubber article is treated by the method of claim 2.

13. The method of claim 11 characterized in that the said rubber article is treated by the method of claim 3.

14. The method of claim 11 characterized in that the said rubber article is treated by the method of claim 4.

* * * * *